(12) United States Patent
Parker et al.

(10) Patent No.: US 6,499,917 B1
(45) Date of Patent: Dec. 31, 2002

(54) THREAD-MILLING CUTTER AND A THREAD-MILLING INSERT

(75) Inventors: Mike J. Parker, Solihull West Midlands (GB); David Quirke, Warwickshire (GB)

(73) Assignee: Seco Tools AB, Fagersta (SE)

( * ) Notice: Subject to any disclaimer, the term of this patent is extended or adjusted under 35 U.S.C. 154(b) by 57 days.

(21) Appl. No.: 09/605,867

(22) Filed: Jun. 29, 2000

(30) Foreign Application Priority Data

Jun. 29, 1999 (SE) .............................................. 9902453

(51) Int. Cl.$^7$ .............................. B26D 1/12; B23C 5/20
(52) U.S. Cl. .............................. 407/25; 407/36; 407/40; 407/47
(58) Field of Search .............................. 407/25, 24, 36, 407/37, 41, 49, 47, 40, 44, 45, 113, 114, 115, 116, 117; 409/66, 47

(56) References Cited

U.S. PATENT DOCUMENTS

| | | | | |
|---|---|---|---|---|
| 735,413 A | * | 8/1903 | Schellenbach | 408/170 |
| 1,730,399 A | * | 10/1929 | Wetmore | 408/233 |
| 1,778,260 A | * | 10/1930 | Kearney | 407/38 |
| 2,456,842 A | * | 12/1948 | Rutbell | 407/40 |
| 4,425,063 A | * | 1/1984 | Striegl | 408/81 |
| 4,547,103 A | * | 10/1985 | Pape et al. | 408/197 |
| 4,913,604 A | * | 4/1990 | Zaengerle | 409/74 |
| 5,059,070 A | * | 10/1991 | Baker | 407/114 |
| 5,088,861 A | | 2/1992 | Little | |
| 5,112,162 A | * | 5/1992 | Hartfod et al. | 407/49 |
| 5,480,272 A | * | 1/1996 | Jorgensen et al. | 408/222 |
| 5,873,684 A | | 2/1999 | Flolo | |
| 5,924,825 A | * | 7/1999 | Schwab et al. | 407/42 |

* cited by examiner

Primary Examiner—Henry Tsai
(74) Attorney, Agent, or Firm—Burns, Doane, Swecker & Mathis, LLP

(57) ABSTRACT

A thread-milling cutter includes a cutting head with cutting insert pockets and thread-milling inserts received in respective pockets. An attachment portion integral with the cutting head is received in a drive coupling. Each insert includes a recess forming an abutment surface that is engaged by a screw to secure the insert in the pocket. The abutment surface is inclined in a manner causing the screw to push the insert deeper into the pocket.

6 Claims, 4 Drawing Sheets

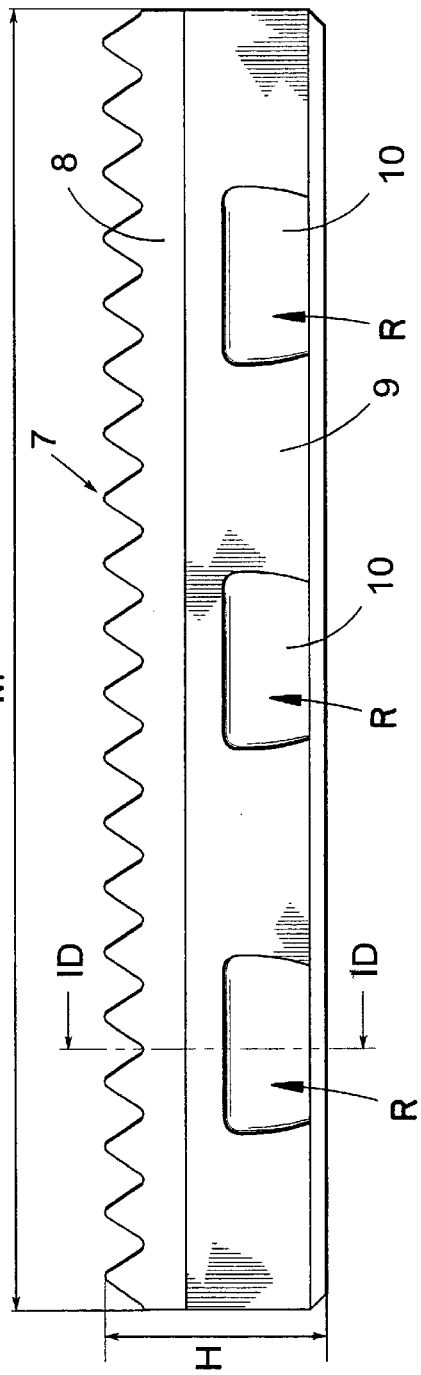
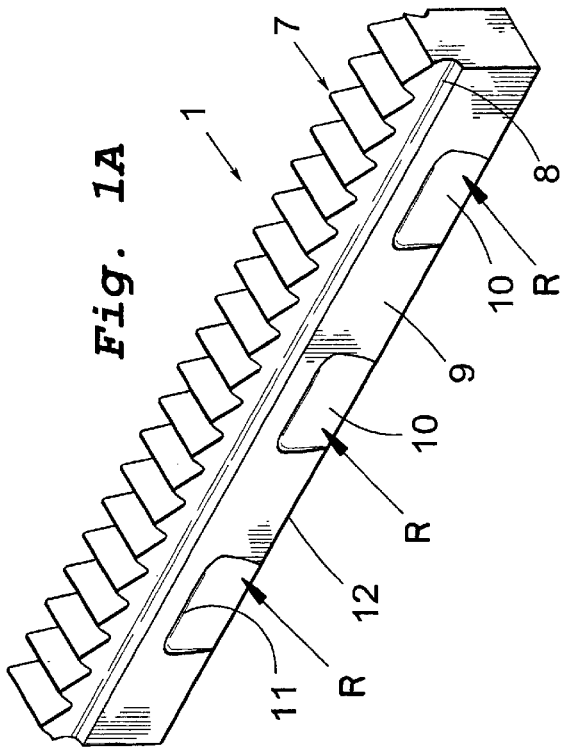
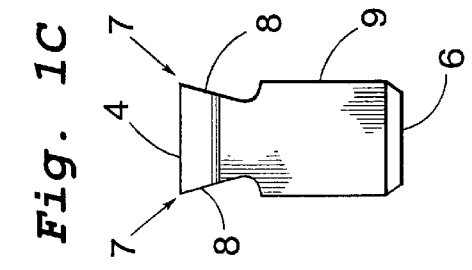
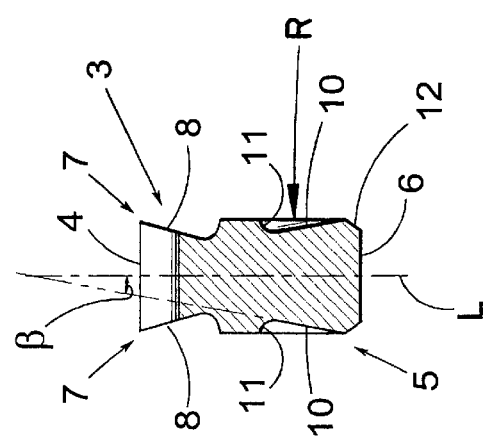

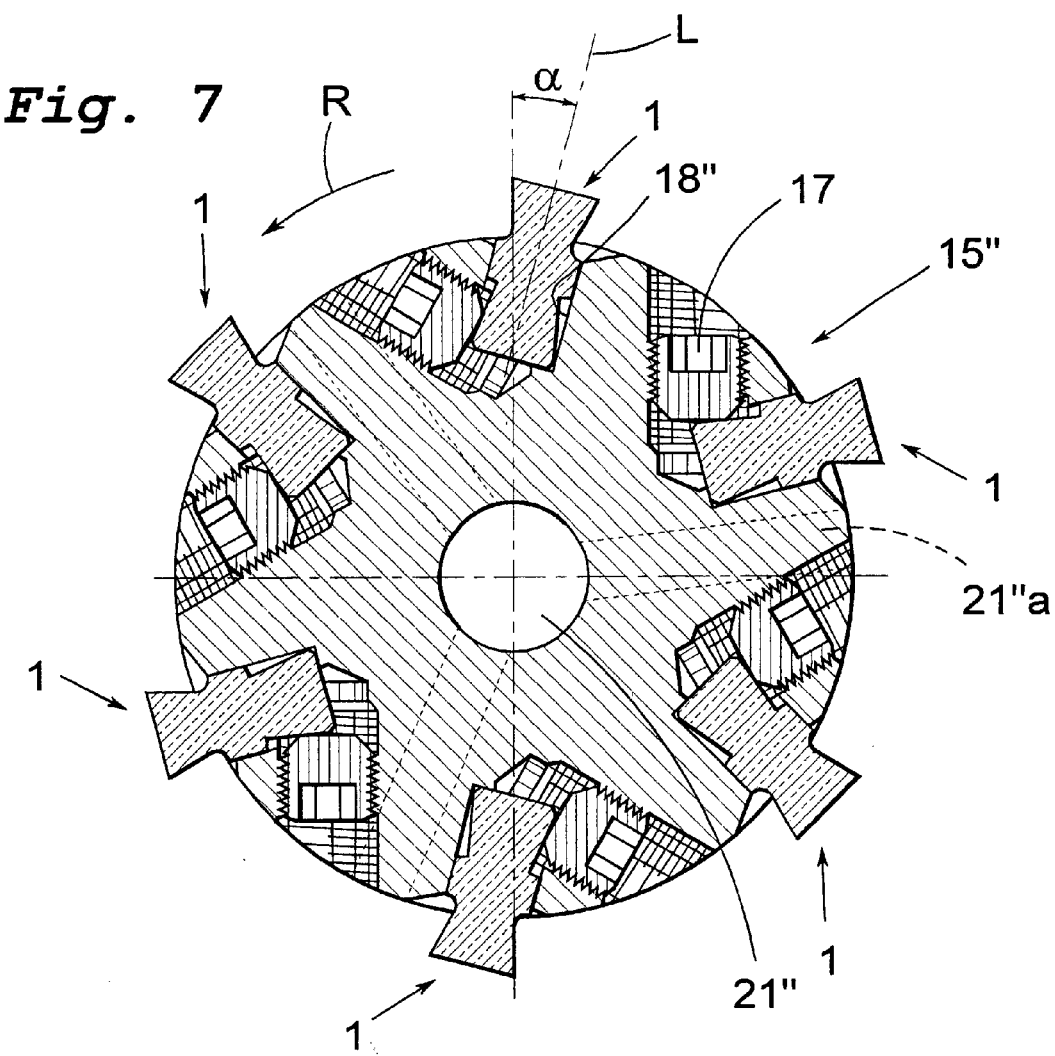
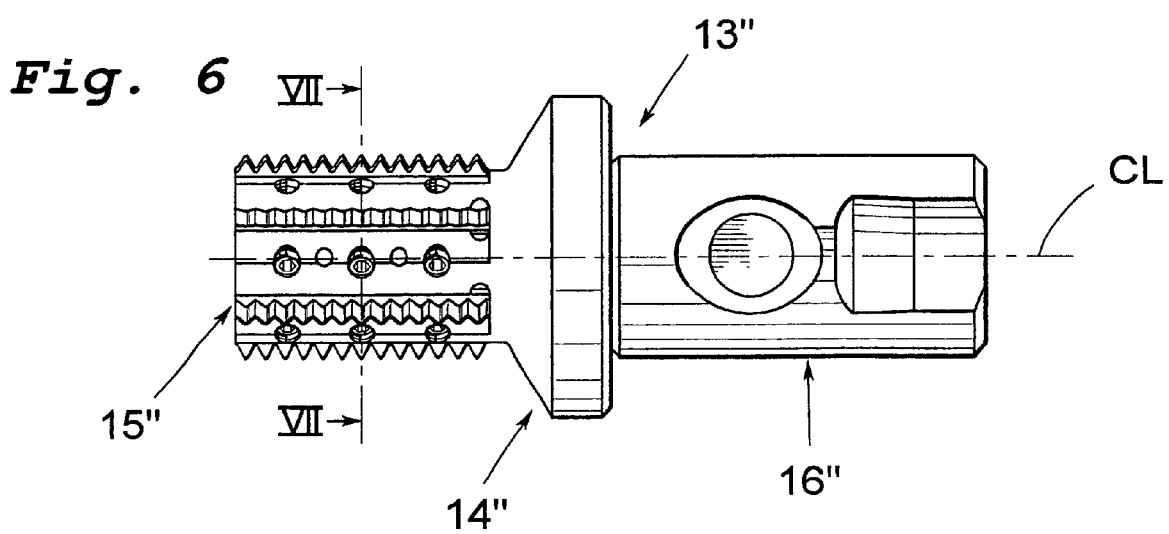

THREAD-MILLING CUTTER AND A THREAD-MILLING INSERT

FIELD OF THE INVENTION

The present invention relates to a thread-milling cutter, which includes a cutting head with a number of cutting insert pockets, a number of thread-milling inserts, which are received in said cutting insert pockets and an attachment integrated with the cutting head, which is intended to be received in a tool coupling. The invention also relates to a thread-milling insert, which is mounted in the thread-milling cutter.

PRIOR ART

Through U.S. Pat. No. 5,873,684 a thread-milling cutter is previously known, which discloses a tool head, which is provided with a number of cutting insert pockets for receiving a corresponding number of thread-milling inserts. The thread-milling inserts are fixed in their cutting insert pockets by providing the inserts and associated cutting insert pocket with axially extending grooves. After a cutting insert is mounted in its cutting insert pocket, when said grooves are aligned with each other, a locking pin is inserted into the substantially cylindrical space which is defined by said grooves. Thereby the position of the cutting insert is fixed in the cutting insert pocket. The locking pin is secured by screwing locking screws into threaded holes in the milling cutter body, said holes terminating in the area of the groove in the milling cutter body.

The mounting becomes long-winded by the use of a locking pin for each cutting insert. Furthermore no satisfactory radial positioning of the locking pin is obtained since the locking pin cooperates with the groove of the cutting insert pocket, i.e., it is not probable that the effect of the locking screws on the locking pin bring about that the cutting insert abuts against the bottom of the cutting insert pocket. In addition at large radial cutting forces it can be a risk that the cooperation of the locking pin with the grooves in the cutting insert and the cutting insert pocket does not give a sufficiently exact positioning of the inserts in the radial direction, i.e. a certain dislocation of the inserts in radial direction may occur.

In the threading cutter according to U.S. Pat. No. 5,873,684, each threading insert has only one cutting edge and the cutting insert is provided with a clearance in connection with the cutting edge.

OBJECTS AND FEATURES OF THE INVENTION

A primary object of the present invention is to provide a thread-milling cutter of the above-defined type, which is provided with a number of thread-milling inserts which are fixed in their respective associated cutting insert pockets in a constructively outstanding and simple manner but still satisfactory functionable.

Still another object of the present invention is to provide a thread-milling cutter wherein the positioning of the thread-milling inserts in the radial and axial directions is extraordinarily distinct.

Still another object of the present invention is to provide a thread-milling cutter having parts that require a small space, and therefor tools of small dimensions can be provided with more cutting inserts than prior art tools of corresponding dimensions.

Still another object of the present invention is to provide a thread-milling insert that exhibits a long life span.

SUMMARY OF THE INVENTION

One or more objects of the present invention are realized by a thread-milling cutter which comprises a tool holder and a plurality of thread-milling inserts mounted in the tool holder. The tool holder defines an axis of rotation and includes a cutting head and an integral attachment portion adapted to be received in a drive member. The cutting head includes a plurality of pockets extending generally axially in the cutting head, at least one screw-threaded hole communicating with each pocket, and a screw mounted in each hole for adjustment toward and away from the respective pocket. Each of the thread-milling inserts includes a securing portion received in a respective one of the pockets. The securing portion includes an abutment surface arranged to be pressed by one of the screws. The abutment surface forms an acute angle with a longitudinal center plane of the insert. The angle is oriented so that a pressing force transmitted from the screw to the abutment surface includes a component tending to push the insert in a generally radially inward direction within the respective pocket.

The invention also pertains to a thread-milling insert which comprises a cutting edge, a securing portion adapted to be mounted in a tool holder, and an underside. The securing portion includes an abutment surface disposed between the underside and the cutting edge. The abutment surface forms an acute angle with a longitudinal center plane of the insert, wherein the abutment surface diverges from the center plane in a direction toward the underside.

BRIEF DESCRIPTION OF THE DRAWINGS

Below a number of embodiments of the present invention are described with reference to the enclosed drawings, wherein:

FIG. 1A shows a perspective view of a thread-milling insert according to the present invention which is intended to be mounted in a thread-milling cutter according to the present invention;

FIG. 1B shows a plan view of the thread-milling insert of FIG. 1A;

FIG. 1C shows an end view of the thread-milling insert of FIG. 1A;

FIG. 1D shows a cross-section along line ID—ID in FIG. 1 B;

FIG. 6 shows a side view of a third embodiment of a thread-milling cutter according to the present invention; and FIG. 7 shows a cross-section along VII—VII in FIG. 6.

DETAILED DESCRIPTION OF PREFERRED EMBODIMENTS OF THE INVENTION

Figure 3:
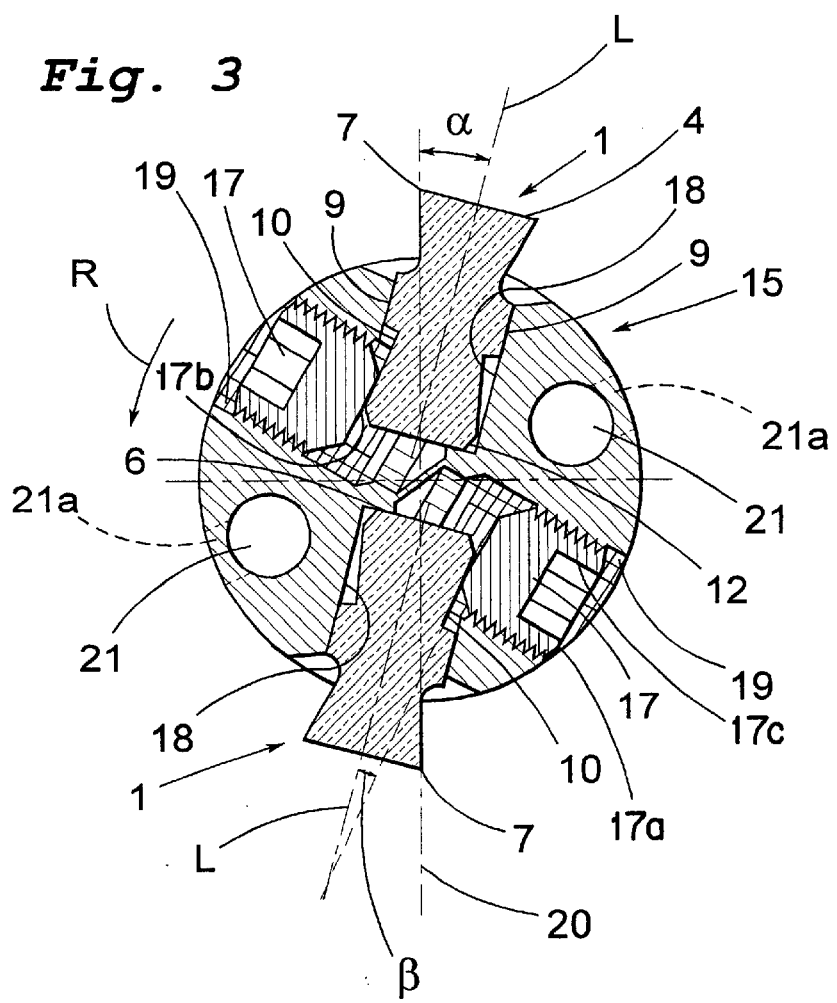
FIG. 3 shows a cross-section after III—III in FIG. 2.

The thread-milling insert 1 according to the present invention shown in FIGS. 1A–1D has a generally parallelepipedical basic shape and has a chip removing portion 3 and a securing portion 5. In FIGS. 1C and 1D the longitudinal main plane L of the thread-milling insert 1 is illustrated. The thread-milling insert 1 is preferably made of hard metal. The chip removing portion 3 is provided with two cutting edges 7, each of which consisting of a number of teeth. As apparent from FIG. 1 the thread-milling insert 1 has a negative geometry at its chip removing portion 3, i.e., the thread-milling insert 1 does not disclose any built-in clearance at a clearance surface 4 which connects the cutting edges 7 and forms a straight angle with the main plane L of the thread-milling insert 1. This enables the thread-milling insert 1 to be indexable, i.e. both the cutting edges 7 can be utilized in the thread-milling cutter 13 according to the present invention. A rake face 8 is formed inside and in connection with the respective cutting edge 7.

The securing portion 5 of the thread-milling insert 1 discloses two planar support surfaces 9, which are parallel to each other and are situated at each side of the thread-milling insert 1. A number of recesses R, three recesses in the shown embodiment, are provided in said support surfaces 9, each of said recesses having a planar abutment surface 10 which forms an acute angle P with the main plane L of the thread-milling insert 1. A step 11 is provided in said recess, at the end closest to the chip-removing portion 3, which step connects to the support surface 9. At the end facing towards the chip removing portion 3 the surface 10 of the recess R exits into nothing, i.e. it intersects and is situated at the same level as the surrounding support surface 9. This means that in the section ID—ID, see FIG. 1D, the securing portion 5 is of dovetail shape.

According to the shown embodiment of the thread-milling insert 1 there are chamfered corners 12 at the securing portion 5. The corners are situated between its respective associated support surface 9 and a planar underside 6 of the securing portion 5 of the thread-milling insert 1. The underside 6 forms a straight angle with the main plane L of the thread-milling insert 1.

In FIG. 1A the length of the thread-milling insert 1 has been depicted by M and its height by H. According to a preferred embodiment the thread-milling insert 1 length M=40 mm and its height H=7 mm. The relationship M/h should according to the invention lie in the interval of 4–8.

Figure 2:
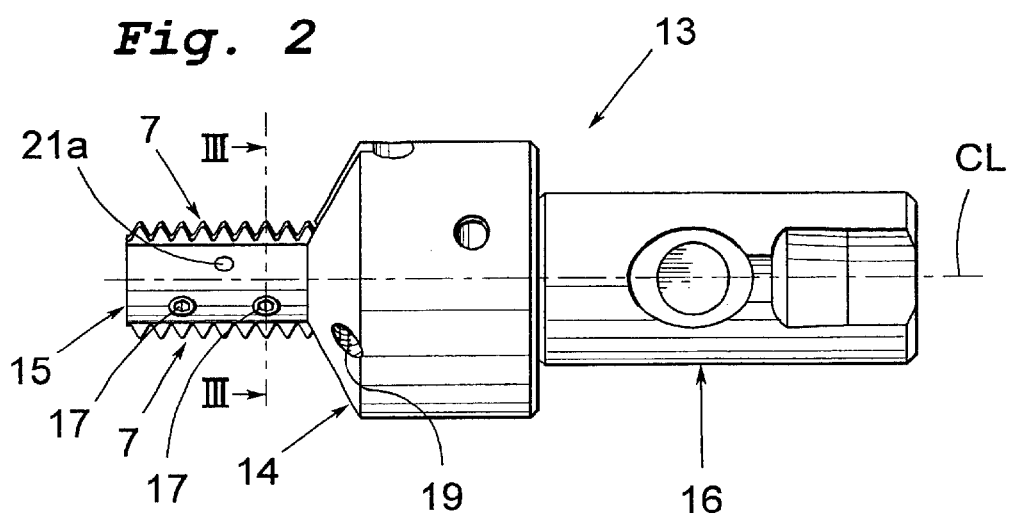
FIG. 2 shows a side view of a first embodiment of a thread-milling cutter according to the present invention.

The first embodiment of a thread-milling cutter 13 according to the present invention shown in FIG. 2 includes a tool holder comprising a cutting head 14 with an insert receiving part 15. Furthermore the holder includes an attachment 16, which in the shown embodiment is in the shape of a shank. The attachment 16 shall be received in a tool coupling of a drive member (not shown).

The cutting head 14 is provided with two thread-milling inserts 1 according to the present invention. From FIG. 2 is apparent that each thread-milling insert 1 is secured in the cutting head 14 by means of three screws 17, the function of which is more closely illustrated in FIG. 3.

Such as is apparent from FIG. 3 the insert receiving part 15 is provided with two cutting insert pockets 18 in the shape of substantially radially extending pockets in the insert receiving part 15. Each cutting insert pocket 18 receives a thread-milling insert 1 according to the present invention. The opposite walls in the cutting insert pockets 18 are substantially parallel, i.e. the respective cutting insert pocket 18 defines a parallel epipedical space, in which a thread-milling insert 1 according to the present invention is received.

Three threaded holes 19 are provided in connection with each cutting insert pocket 18 and a screw 17 is received in each hole 19. Each screw includes first and second end surfaces 17a, 17b with a screw thread disposed therebetween. The first end surface 17a faces away from the pocket 18 and has a cavity 17c formed therein for receiving a tool (not shown). The second end surface 17b faces toward the pocket 18. The screw 17 is provided in front of the associated cutting insert pocket 18 in the rotational direction R of the thread-milling cutter, see FIG. 3. Such as is also apparent from FIG. 3 the respective hole 19 intersects the adjacent wall of the associated cutting insert pocket 18, i.e. the hole 19 communicates with the cutting insert pocket 18. This means that when the thread-milling insert 1 is correctly received by the associated cutting insert pocket, the second end surface 17b of the screw 17 in the hole 19 can be brought in contact with a recess R which forms a part of a dovetail cross-section of the thread-milling insert 1. The center axis of the screw 17 perpendicularly intersects the surface 10 of the respective recess. In this connection, it shall be mentioned that the above described relationship between the height/width of the thread-milling insert 1, which should lie in the interval of 4–8, is of importance to achieve a rigid fixation of the thread-milling insert 1 in the associated cutting insert pocket 18. Since the height H is relatively small in relation to the length M of the thread-milling insert, the point of action of the screw 17 on the surface 10 will lie relatively close to the cutting edge 7, which promotes a rigid position of said cutting edge 7.

The screw 17 will then press the support surface 9 which is situated on the side of the thread-milling insert 1 facing away from the screw 17 towards one wall of the cutting insert pocket 18 and also will press the corner 12 of the thread-milling insert 1 facing away from the screw 17 towards the transition (i.e., intersection) between said one wall and the bottom of the cutting insert pocket 18. The wedge shape of the securing portion 5, which is formed by the surface 10 of said recess, will make the screw 17 exert a force, having a radially inwardly directed component, on the thread-milling insert 1. That ensures that the thread-milling insert 1 and the underside 6 of the securing portion 5 will tightly abut against the bottom of the cutting insert pocket 18. The position of the thread-milling insert 1 in the cutting insert pocket 18 is consequently defined partly by the support surface 9 and partly by the underside 6. Both of those surfaces 6, 9 are situated in planes, which are perpendicular to each other. This results in the position of the thread-milling insert 1 in the cutting insert pocket 18 being defined in a satisfactory manner. In this connection, it shall be pointed out that there is substantially no contact between the support surface 9 of the thread-milling insert 1 facing towards the screw 17 and the wall of the cutting insert pocket 18 that is intersected by the screw 17.

Positioning of the thread-milling insert 1 in the axial direction is done by providing each cutting insert pocket 18 with an axial stop S, at the end of the cutting insert pocket 18 which is situated closest to the attachment 16. This is more clearly shown in FIG. 4.

As is apparent from FIG. 3 the cutting edge 7 of the thread-milling insert 1 with the associated chip surface 8 are situated in an axial plane 20 of the thread-milling cutter 13 which contains the axis CL of rotation of the thread-milling cutter 13. The main or longitudinal center plane L of the thread-milling insert 1 forms a certain acute angle α with said axial plane 20 to obtain necessary clearance for the cutting edge 7, i.e. in FIG. 3 the thread-milling insert 1 extends on each side of said axial plane 20.

The insert receiving part 15 of the thread-milling cutter 13 is provided with two cooling channels 21 as shown in the embodiment of FIG. 2 and 3, which extend in the axial direction of the insert receiving part 15. The cooling channels 21 are situated diametrically opposite each other with regard to the axis CL of rotation of the thread-milling cutter 13. The cooling channels 21 terminate in the jacket surface of the insert receiving part 15 at 21a, i.e. rearwardly of the associated thread-milling insert 1 in the rotational direction R of the thread-milling cutter 13, see FIG. 3.

The thread-milling inserts 1 are identical and as is apparent from FIG. 2 the thread-milling inserts 1 are mounted in the insert receiving part 15 such that corresponding teeth of the respective cutting edges 7 are situated at same axial level, i.e., at the same radial distance from the axis of rotation CL. With such a cutting insert configuration, machining is performed by means of the thread-milling cutter 13 according to the present invention through circular interpolation, i.e. the axis CL of rotation of the thread-milling cutter 13 circulates (orbits) during machining about α central axis of the hole or the spigot which forms an internal or external thread by means of the teeth of the cutting edge 7.

When a first cutting edge 7 of the thread-milling insert 1 is worn-out, the screw 17 is untightened and the thread-milling insert 1 is indexed such that a second cutting edge 7 occupies the active position, i.e. is situated in the axial plane 20.

Figure 5:
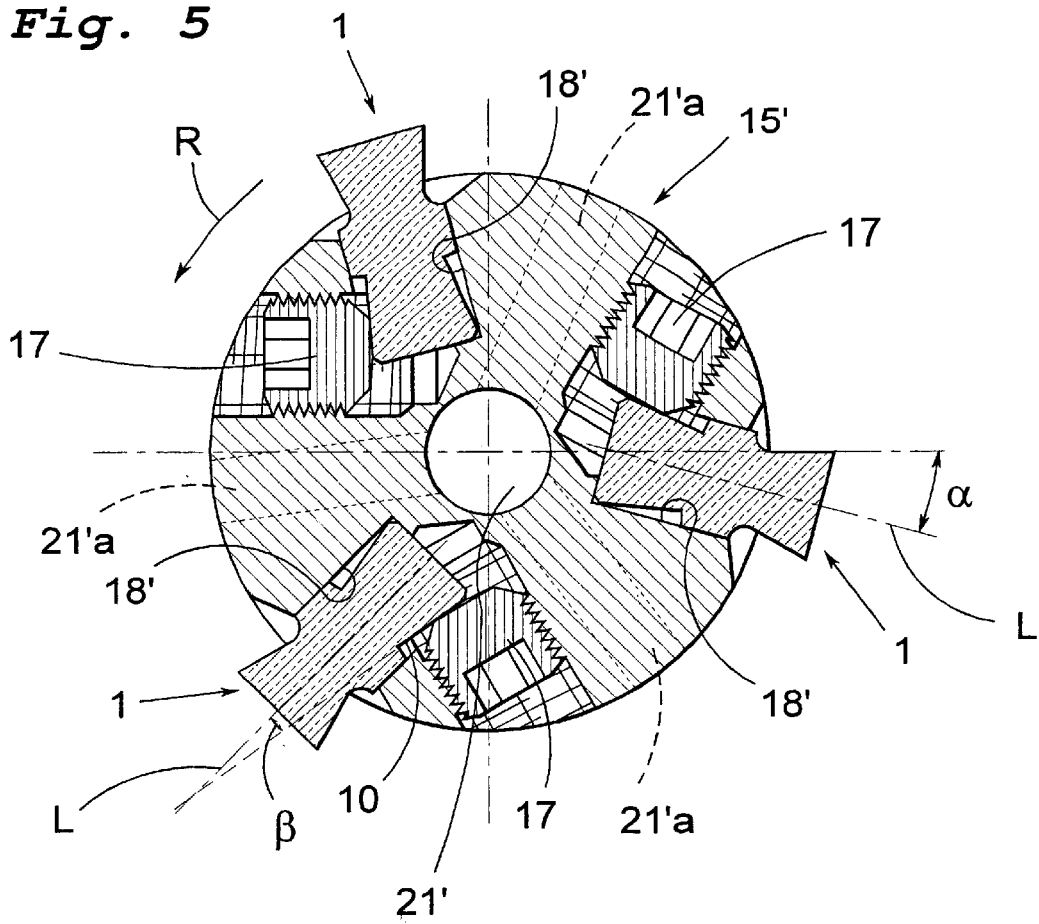
FIG. 5 shows a cross-section long V—V in FIG. 4.
Figure 4:
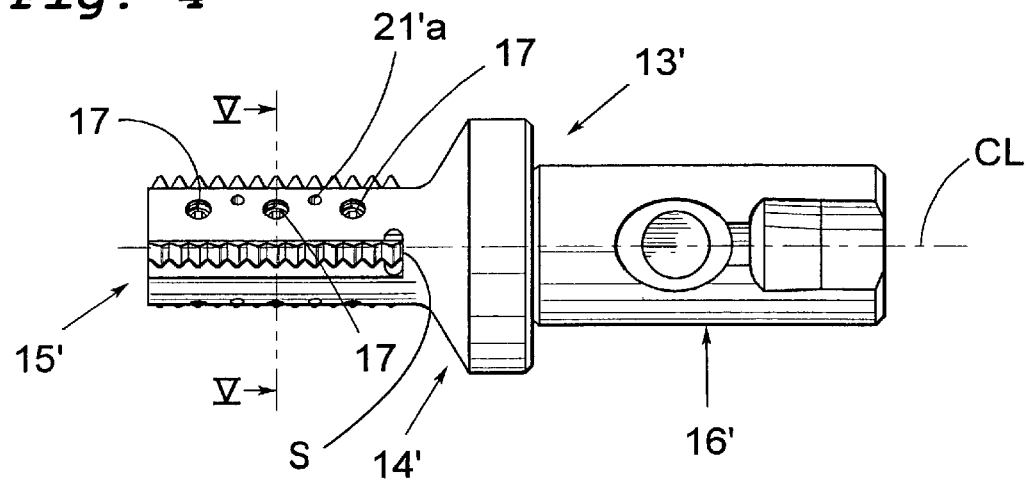
FIG. 4 shows a side view of a second embodiment of a thread-milling cutter according to the present invention.

The second embodiment of a thread-milling cutter 13' shown in FIGS. 4 and 5 has principally the same structural design as the thread-milling cutter 13 according to FIGS. 2 and 3. Thus the thread-milling cutter 13' includes a cutting head 14' and an attachment 16'. The insert receiving part 15' of the thread-milling cutter 13' is provided with three cutting insert pockets 18'. Each cutting insert pocket 18' receives a thread-milling insert 1, which preferably has an identical design as the thread-milling inserts 1 according to FIGS. 1–3. This means that each of the thread-milling inserts 1 according to FIGS. 4 and 5 is secured in the insert receiving part 15' by means of three screws 17. For clarity, it shall be pointed out that the cutting insert pockets 18' possess a length which is adapted to the length of the thread-milling inserts 1.

Three threaded holes 19 are provided in connection with each cutting insert pocket 18', each receiving a screw 17. The holes 19 are oriented in a corresponding manner relative to the cutting insert pockets 18 as that of the embodiment according to FIGS. 2 and 3 and fixing of the thread-milling inserts 1 is done in principally the corresponding manner as that of the embodiment according to FIGS. 2 and 3, and therefor reference is made to the earlier disclosure when it comes to the fixation of the thread-milling inserts 1 in the cutting insert pockets 18'.

As is apparent from FIG. 5 the insert receiving part 15' is provided with a centrally positioned cooling channel 21' since there is enough space at the center of the insert receiving part 15' for such a channel in the embodiment according to FIGS. 4 and 5. The cooling channel 21' branches off at certain axial levels and terminates in the jacket surface of the insert receiving part 15' via openings 21'a.

The third embodiment of a thread-milling cutter 13" shown in FIGS. 6 and 7 has principally the same structural design as the thread-milling cutters 13 and 13' according to the above described embodiments. Thus the thread-milling cutter 13" includes a cutting head 14" and an attachment 16". The insert receiving part 15" of the thread-milling cutter 13" is provided with six cutting insert pockets 18". Each cutting insert pocket 18" receives a thread-milling insert 1, which is identical to the thread-milling insert 1 according to FIGS. 1–5. This results in each of the thread-milling inserts 1 according to FIGS. 6 and 7 being secured in the insert receiving part 15" by means of three screws 17.

Consequently, in connection with each cutting insert pocket 18" there are provided three threaded holes 19, each receiving a screw 17. The holes 19 are oriented in a corresponding manner relative to the cutting insert pockets 18" as that of the embodiments described above, and fixing of the thread-milling inserts 1 is done in principally the corresponding manner as that of the embodiments described above, and therefor reference is made to the earlier disclosure when it comes to the fixation of the thread-milling inserts 1 in the cutting insert pockets 18".

The embodiment according to FIG. 6 and 7 of the thread-milling cutter 13" according to the present invention is provided with a central cooling channel 21", which with a good margin can be contained in the insert receiving part 15". The cooling channel 21" branches off in certain axial levels and terminates in the jacket surface of the insert receiving part 15" via openings 21"a.

To sum up, it can be stated that the thread-milling cutter 13; 13'; 13" according to the present invention discloses an outstandingly simple, user friendly and reliable principle for clamping of the thread-milling inserts 1 in the insert receiving part 15; 15'; 15'. The inventive design of the thread-milling inserts 1 results in only a limited number of screws 17 being needed to firmly tighten said thread-milling insert 1 in a satisfactorily manner.

CONCEIVABLE MODIFICATION OF THE INVENTION

As discussed above in connection with the embodiment according to FIGS. 2 and 3, the center axis of the screw 17 perpendicularly intersects the surface 10 of the recess R onto which the screw 17 abuts. In addition, the center axis of the screw 17 is situated in the plane of the paper in FIG. 3. Alternatively, to obtain a more distinct positioning in the axial direction of the thread-milling insert 1, the center axis of the screw 17 may be inclined relative to the plane of the paper in FIG. 3. This inclination must be such that the screw 17 exerts a force on the thread-milling insert 1 in the axial direction towards the axial stop S of the cutting insert pocket 18; 18'; 18', which is situated at the end of the cutting insert pocket 18; 18'; 18" which is facing towards the attachment 16; 16'; 16". Thereby also the surface 10 of the recess R will be oriented such that said surface 10 is always perpendicular to the center axis of the screw 17.

The attachment 16; 16'; 16" is provided with a shank in all above described embodiments. However it is fully conceivable within the scope of the present invention that the attachment could have another constructive design depending on which type of tool coupling the attachment is to be received in.

In the above described embodiments two, three or six thread-milling inserts 1 can be received in the insert receiving part 15; 15'; 15". The invention is however in no manner limited to these exact numbers of thread-milling inserts 1, but rather the number of thread-milling inserts can be varied along with the requirements of the designer.

What is claimed is:

1. A thread-milling cutter comprising a tool holder and a plurality of reversible thread-milling inserts mounted therein;

the tool holder defining an axis of rotation and including a cutting head and an integral attachment portion adapted to be received in a drive member, the cutting head including:

a plurality of pockets extending generally axially in the cutting head, at least one screw-threaded hole communicating with each pocket, and a screw mounted in each hole for adjustment away from the respective pocket, the screw including first and second end surfaces and screw threads disposed therebetween, the first end surface facing away from the respective pocket and including a cavity shaped to receive a turning tool, the second end surface facing the pocket;

each insert comprising an outer cutting portion and an inner securing portion, the cutting portion and the securing portion being intersected by a longitudinal center plane of the insert, wherein the insert is configured symmetrically with respect to the center axis, the cutting portion including two identical thread-cutting edges disposed on respective sides of the center plane;

the securing portion of each insert mounted in a respective one of the pockets and including a pair of recesses disposed on respective sides of the center plane, each recess including an abutment surface, one of the recesses of each insert facing a respective one of the screws, with the abutment surface thereof pressed by the second end face of the screw, the abutment surface forming an acute angle with the center plane of the insert, the angle oriented so that a pressing force transmitted from the screw to the abutment surface includes a force component pushing the insert in a generally radially inward direction within the respective pocket;

each insert being reversible to enable either of the recesses thereof to face the respective pocket, and to enable a respective one of the thread-cutting edges to be disposed in an active cutting position.

2. The cutter according to claim 1 wherein each pocket has a plurality of the screw-threaded holes associated therewith, each of the holes receiving one of the screws, wherein all of the screws associated with each pocket press against the same abutment surface.

3. The cutter according to claim 1 wherein each pocket includes a bottom wall, and the securing portion includes a radially inwardly facing underside engaging the bottom wall.

4. The cutter according to claim 3 wherein the securing portion of each insert includes a support surface extending between the underside and the cutting edge.

5. A reversible thread-milling insert comprising a body forming a cutting portion at one end thereof and a securing portion at another end thereof; the cutting portion and the securing portion being intersected by a longitudinal center plane of the insert; the insert configured symmetrically about the center plane; the cutting portion including two identical thread-cutting edges disposed on respective sides of the center plane; the securing portion including a pair of recesses disposed on respective sides of the center plane; each recess including a planar abutment surface forming an acute angle with respect to the center plane, each abutment surface being inclined in a direction away from the cutting portion and away from the center plane at an acute angle; the insert being reversible wherein either of the thread-cutting edges can be disposed in an active thread cutting portion.

6. A reversible thread-milling insert comprising a body forming a cutting portion at one end thereof and a securing portion at another end thereof; the cutting portion and the securing portion being intersected by a longitudinal center plane of the insert; the insert configured symmetrically about the center plane; the cutting portion including two identical thread-cutting edges disposed on respective sides of the center plane; the securing portion including a pair of non-through-going recesses disposed on respective sides of the center plane; each recess defining an abutment surface forming an acute angle with respect to the center plane, each abutment surface being inclined in a direction away from the cutting portion and away from the center plane at an acute angle; the insert being reversible wherein either of the thread-cutting edges can be disposed in an active thread cutting portion.

\* \* \* \* \*